March 14, 1967 J. W. SCOTT 3,309,305

FLUIDIZED HYDROCRACKING OF RESIDUAL HYDROCARBONS

Filed Feb. 7, 1966 3 Sheets-Sheet 1

INVENTOR
JOHN W. SCOTT
BY F. E. Johnston
Ralph L. Freeland Jr.
ATTORNEYS

March 14, 1967 J. W. SCOTT 3,309,305

FLUIDIZED HYDROCRACKING OF RESIDUAL HYDROCARBONS

Filed Feb. 7, 1966 3 Sheets-Sheet 2

INVENTOR
JOHN W SCOTT
BY P. E. Johnston
Ralph L. Freeland, Jr.
ATTORNEYS

March 14, 1967 J. W. SCOTT 3,309,305

FLUIDIZED HYDROCRACKING OF RESIDUAL HYDROCARBONS

Filed Feb. 7, 1966 3 Sheets-Sheet 3

INVENTOR
JOHN W. SCOTT
BY [signature]
[signature]
ATTORNEYS

United States Patent Office 3,309,305
Patented Mar. 14, 1967

3,309,305
FLUIDIZED HYDROCRACKING OF RESIDUAL HYDROCARBONS
John W. Scott, Ross, Calif., assignor to Chevron Research Company, San Francisco, Calif., a corporation of Delaware
Filed Feb. 7, 1966, Ser. No. 525,444
8 Claims. (Cl. 208—111)

This is a continuation-in-part of my application Ser. No. 141,941, filed Sept. 25, 1961, now U.S. Patent No. 3,233,-981.

The present invention relates to a method of contacting a hydrocarbon fluid phase with a fluidized solid particulate catalyst phase. More particularly it relates to a method of hydroprocessing high-boiling petroleum oils, shale oils, coal oils, crude oil fractions, and residua by improving contact between a fluid stream or streams of hydrogen and such hydrocarbon fractions and fluidized catalyst particles. In a preferred form, these dissimilar phases simultaneously flow vertically through a plurality of horizontal velocity-modifying means that divide the vessel into a plurality of vertically disposed mixing or reaction zones.

An object of the invention is to improve hydrocracking or hydrodesulfurization of crude oil fractions by uniformly and controllably flowing catalyst particles (on the order of about 1/8" to 1/100" in diameter) and a fluid phase or phases comprising heavy hydrocarbon molecules and hydrogen through a plurality of reaction zones that preferentially divide the mass flow so that the catalyst phase more readily passes through some of said passageways whose central portion is enlarged in area relative to either of its ends while the hydrocarbon phase more readily passes through other passageways whose central portion is reduced in area relative to either of its ends.

In catalytic refining of heavy, or residual petroleum stocks, it is desirable to use small catalyst particles for effective contacting of fluids with the particles. If the particles are small, it is possible to react hydrogen and higher molecular weight hydrocarbons at quite high fluid velocities, thereby permitting rapid conversion. If this conversion is carried out in conventional downflow reactors, excessive pressure drop is encountered with particles much below about 1/16". Upflow of the fluid phase or phases has advantage in this regard because the particles can be separated and suspended therein with very low pressure drops by operating in hydrodynamic regions which result in higher void fractions than can exist in conventional fixed or otherwise restrained beds. These operating regions include those in which the solid particles move freely about in the fluid, and which are called "fluidized" beds of solid.

The fluidized beds have one characteristic which represents a real difficulty in high conversion reactions: The extensive mixing which is encountered when small particles are thus suspended in the fluid results in bypassing of some unconverted or relatively unconverted feed to the fluid outlet. This well-known problem can be mitigated by employing a series of reactors, or by using mechanical means for staging or for isolating several beds of catalyst within one reactor through use of bubble-cap trays, sieve trays, and the like. These devices have serious drawbacks, as described hereinbelow, especially when a third phase is present, such as hydrogen gas. The gas phase effects a disruption of any liquid-solid mixed phase in the reactor, but is especially effectively handled in the present invention.

While it has been proposed heretofore to carry on fluidized catalytic hydrocarbon reactions in columns containing bubble plates and downcomers, bubble plates contain relatively flat surfaces on which solid particulate material has a tendency to classify and settle out.

Under normal conditions in such previously known apparatus, it has been found very difficult to maintain hydrodynamic stability of flow. This is because individual passageways, such as downcomers in conventional bubble trays, or chimneys, if blown clear of slurried, or fluidized, catalyst by local disturbance, do not readily return to their previous and desired, mode of operation as do uniform, preferential flow passageways used in the hydroprocessing method of the present invention. In addition, previously known apparatus for staging such contacting processes involve substantial reduction of available cross section at each stage, as with grids, or sieve trays and tend to classify the fluid catalyst particles by size. Consequently, in addition to problems of entrainment of smaller particles, the overall residence time of smaller particles of the catalyst stream in the apparatus is disproportionately long or, is especially nonuniform vertically. Larger particles then tend to "short circuit" or travel through the vessel more rapidly. In apparatus of the type disclosed herein, on the other hand, the fluidized catalyst successively stages from reaction zone to reaction zone within the vessel, so that counterflow of the catalyst particles and the fluid hydrocarbons and hydrogen is facilitated, with much less tendency to classify the catalyst.

In the preferred form of apparatus to carry out my improved fluid catalytic hydrocracking hydrodesulfurization, hydrovisbreaking, or other hydroconversion of residual stocks, the contacting vessel is divided into distinct mixing and velocity-modifying regions or zones by a splitting region or zone that includes vertical passageways uniformly spaced horizontally across the contacting space that permit preferential downward passage of the fluidized catalyst particles and an associated amount of entrained hydrocarbon and hydrogen through one portion of the velocity-modifying zone. Simultaneously, a larger amount of hydrogen and residual hydrocarbon stock associated with a generally lesser amount of fluidized catalyst preferentially pass upward through another portion of the velocity-modifying zone. In one form of apparatus, substantially half of a plurality of passageways include a central portion that is larger in cross-sectional area than either end of the passageway to create preferential down-flow of catalyst. The other half of these passageways have a central portion that is smaller in cross-sectional area than either end to create preferential up-flow of the reacting hydrocarbon stream. All of these passageways give substantially unobstructed communication between the adjacent upper, and lower, mixing zones. These passageways may be formed as elongated slots, substantially parallel to each other, and extending across the width of the velocity-modifying zone or as adjacent truncated pyramidal, or conical, passages.

In an alternate form of apparatus to perform the method of this invention, quench fluids, liquid or gas, may be introduced into the contacting, or reaction, zones intermediate the splitting, or mixing, zones formed by the preferential flow passageways. Liquid feed also may be introduced at an intermediate level in the reactor, and another liquid, for example a recycle stream may be introduced at the bottom.

In accordance with the method of the present invention, hydrocarbons in the form of crude oil fractions and residua are introduced into the lower end of the preferred form of apparatus at a temperature of from 500° to 950° F. at a pressure of 500 to 10,000 pounds per square inch with hydrogen flowing concurrently therewith at a rate of 2000 to 50,000 s.c.f./barrel of hydrocarbon feed. The catalyst in a size range of from 20 to 200 mesh is introduced in the upper portion of the vessel and the rate of flow of catalyst and fluids adjusted to assure proper staging through the preferential vertical passages so that the net catalyst flow is downward and that of the reacting fluids is upward through the vessel. A stream of hydrogen and reacted hydrocarbons are then withdrawn from the top of the vessel as a vapor phase, or mixed liquid and vapor phases, depending upon the extent of cracking conversion desired. At the same time, a recirculation stream, containing a proportionally lower concentration of catalyst particles than the average concentration in the vessel may be returned from the top to a lower level in the vessel. This serves to offer control of gross upward flow of liquid which is independent of the net upward flow of liquid. The latter, of course, can be very low in cases where high cracking conversion is sought, and could be zero at the top of a staged fluidized reactor operating at 100% conversion as is possible by practice of this invention.

This invention shows special advantage in high conversion reactions such as residuum desulfurization and hydrocracking. The velocity-modifying or -staging zones effectively prevent bypassing of feed to the top of the reactor, a characteristic of the typical well-mixed fluidized bed. This means that progressive conversion takes place as the fluid proceeds upward through the succeeding mixing and reaction zones which are defined by the staging means. The fluids leaving the top are thus the most completely converted in the reactor. Alternatively, liquid may be returned from top to any lower level in the reactor, and catalyst inlet may also be moved to other levels from top to bottom; without compromising the generally uniform upward flow of liquids or the increased conversion of oil or residua being processed.

In general, the net catalyst flow through the reactor may be very small compared to the flow of fluids. It may only need to be replenished at a rate of perhaps 10% to 1% per day, or less. The oil in the system may, however, be replaced in minutes or hours. Desirably, catalyst is replenished by adding it at the top of the reactor, and withdrawing spent catalyst at or near the bottom. Some catalyst fines may also be entrained in the fluids emerging from the top of the reactor. These are readily moved by a simple separation means.

Further objects and advantages of the present invention will become apparent from the following detailed description of the apparatus and its mode of operation, as illustrated in the accompanying drawings which form an integral part of the present specification.

Figure 1:
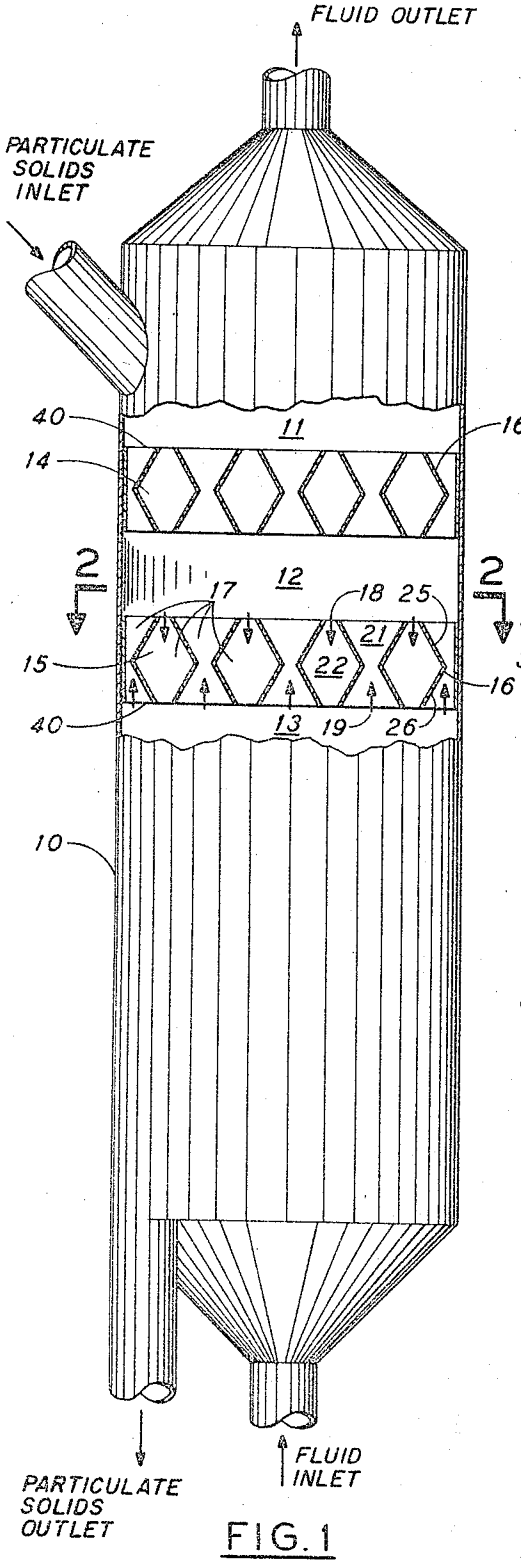
FIGURE 1 is a side elevation view (partially in cross-section) of a contacting vessel suitable for carrying out the method of the present invention, and particularly illustrates a preferred arrangement of velocity-modifying or -staging zones.

Referring now to the drawings, and in particular to FIGURE 1, there is illustrated a contacting, or reaction, vessel 10 which is desirably separated into vertically disposed contacting zones identified as 11, 12, and 13 that are spaced apart by velocity-modifying or -staging means indicated generally as 14 and 15.

These velocity-modifying means 14 and 15 comprise a ring mounting member 40 and horizontal bar members 16 spaced apart to provide passageway means 17 through vertically spaced staging means 14 and 15 which are substantially unobstructed. As shown, the horizontally extending bar members 16 are arranged in each stage to form alternate flow paths through vertical passageways 17, some of which, such as passageways 22, are substantially larger in area in their center portions, while the other passageways 21 are substantially smaller in cross-sectional area at their centers. As illustrated by the arrows 18, the passageway means 22 provide a preferential downward passageway for the catalyst phase being contacted in vessel 10. Arrows 19 through the passageways 21 of smaller central cross-sectional area indicate that the direction of preferential flow of the liquid phase is upward through staging means 15.

This preferential flow in both the upward and downward directions provides a stability of hydrodynamic flow through the reaction vessel 10 by permitting the denser, particulate catalyst phase to be staged downwardly from one reaction zone, such as 12, into reaction zone 13 through a preferential passageway straight through the zone. Passageways 22 form this preferential path for downward flow because of their greater dimensions at their center portions than at both the upper and lower ends. In the system illustrated, this preferential downward flow is achieved by decelerating the upward flowing, fluid phase by increasing area at the center of passageways 22. At the same time the fluid phase preferentially flows upwardly through staging means 15 through passageways 21 due to acceleration of the upward flow by passage through the restricted area in the center of flow paths 21. Thus, substantially half of each velocity-modifying means 14 and 15 give a relative downward movement of the catalyst by increasing the cross-sectional area through the center of some of passageways 17, while a relative upward movement of the fluid is occurring in the other half of the passageways 18 through their smaller central cross-sectional areas. In this way, the denser phase will be preferentially buoyed up through those center portions of smaller cross-sectional area identified as 21, but will preferentially settle through those portions of wider cross-sectional dimension identified as 22. In many cases, the passageways 16 and 21 are substantially equal in their average cross-sectional areas across velocity-modifying means 14 or 15. In general, the relative areas may be designed or adjusted to obtain the desired accommodation to the overall relative flow rates of solid and fluid, and the desired amount of internal circulation of catalyst attained at each level.

Figure 2:
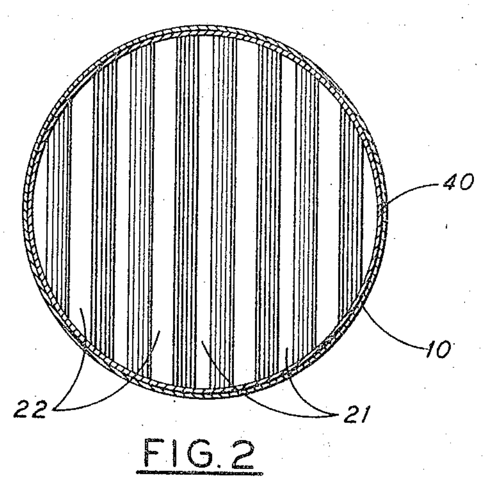
FIGURE 2 is a cross-sectional view of the contacting vessel of FIGURE 1 taken in the direction of arrows 2—2.

In accordance with one form of the invention, as illustrated in FIGURES 1 and 2, these preferential passageway means are defined as elongated slots by the transversely extending bar members 16 being formed with a pair of faces or sidewalls, including upper face 25 and lower face 26. The faces are angularly disposed with respect to each other so that the included angle therebetween is somewhat greater than about 90 degrees. As shown, adjacent members 16 are disposed so that the apices are directly adjacent each other. In this way, center portions 21 and 22 are, respectively, narrower than the upper and lower end portions of the passageway means in which they are included, and wider than the ends. Desirably, the passageways 22 have a configuration such that the upper end is slightly smaller than the lower end and the center portion is about double the area of the ends. Passageways 21, on the other hand, are preferably slightly larger at their upper ends than at the lower ends, with the center being about one-half the area of the ends. However, the average areas along the vertical of both passageways 21 and 22 are nearly equal.

In accordance with an alternative form, the central dimensions of the passageway means through the velocity modifying means are made adjustable by joining together alternate transversely extending bar members 16. As particularly shown in FIGURES 3 and 4, an adjusting bar 30, having affixed thereto the alternate bar members 16, passes through the side of reaction chamber 10 by way of packing gland 31. In this way, the central dimension of the slots 22 may be reduced or increased in size with a corresponding simultaneous variation in the center dimension of passageways 21. This adjustability of the passageway means which preferentially pass catalyst and fluid phases in the reaction chamber is highly desirable when the conditions of treatment are changed, or when the same reaction vessel is used with different hydrocarbons or catalysts, or with different relative rates of flow of catalyst and hydrocarbon.

Figure 3:
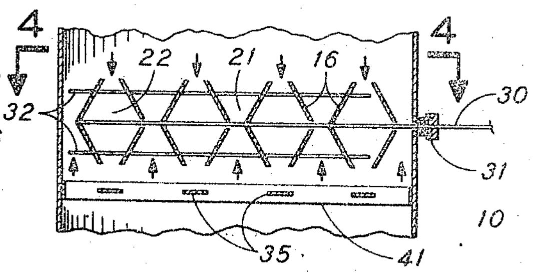
FIGURE 3 is an alternative arrangement of the velocity-staging zone disclosed in FIGURES 1 and 2, and particularly illustrates the means for adjusting the dimensions of the vertical flow passageways therethrough.
Figure 4:
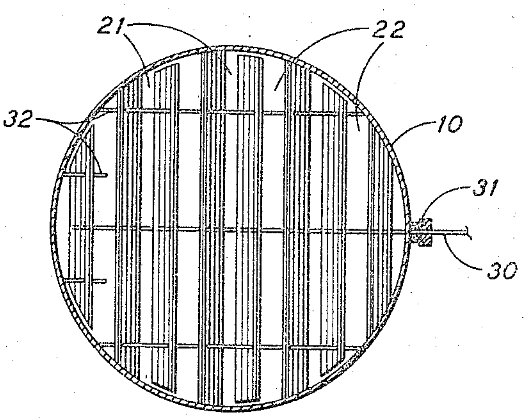
FIGURE 4 is a plan view taken in the directions of arrows 4—4 in FIGURE 3.

Alternatively, or in addition to adjustment by horizontal movement of alternate bars, the relation between top and bottom areas may be altered by a slight rotation of the bars about their longitudinal axes. It will also be understood that the openings in the various velocity-modifying means throughout the vertical length of contacting vessel 10 may be adjusted either simultaneously or individually depending upon the specific process conditions in the vessel. As also shown in FIGURE 3, deflector members 35 supported by ring 41 may be positioned directly below the lower opening in passageway means 22 of greater cross-sectional area for the purpose of preventing sudden disturbances in the upward flowing fluid, such as a surge of gas or high-velocity fluid, from stripping the downwardly flowing denser material from those passageways. While, in general, the relative upward flow may be adjusted for normal steady-state conditions so that such upward flow in the reaction vessel will permit the controlled settling of the denser medium through passageways 22, it is desirable to reduce localized surge conditions that may temporarily affect the smooth functioning of the velocity-modifying means.

Figure 5:
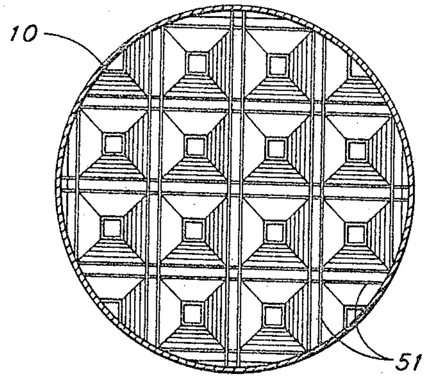
FIGURE 5 is a plan view similar to views 2 and 4, illustrating an alternative arrangement for the velocity-modifying zone in which the passageways are defined by oppositely disposed pairs of truncated pyramidal shells.
Figure 6:
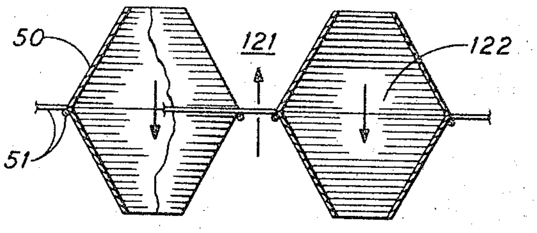
FIGURE 6 is a side elevation view of a portion of the truncated pyramidal shells illustrated in FIGURE 5.

Referring now to the arrangement illustrated in FIGURES 5 and 6, there is shown an alternative form of the present invention. In FIGURES 5 and 6, the passageways are formed by a plurality of truncated pyramidal shell members, identified as 50, supported upon transversely extending rod members 51 arranged in a grid-like pattern to support the center portions of the individual shell members in substantially parallel and vertical positions in the velocity-modifying means. As shown, the apices of these pyramids are directed away from each other and the bases of the two truncated pyramids connected together to form a preferential downward flow path through the center of the shell members while the preferential upward flow path is through the space between the shell members. The rods 51 are again desirably of minimum width to prevent disturbance of the flow paths.

Figure 7:
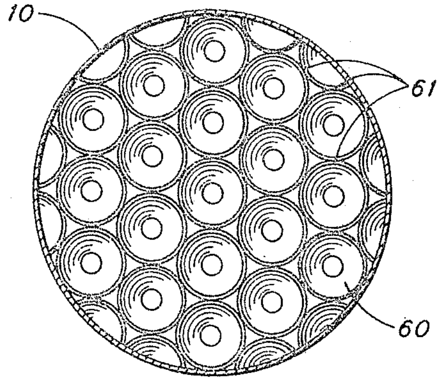
FIGURE 7 is a further modification of the arrangement shown in FIGURE 5 and particularly illustrates the velocity-modifying zone as being constructed of pairs of truncated hollow conical shells in which the apices of each pair of shells are directed toward each other.
Figure 8:
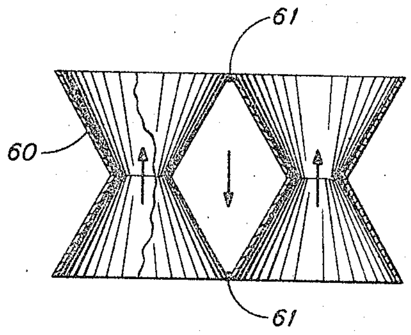
FIGURE 8 is a side elevation of the truncated conical shells shown in FIGURE 7.

FIGURES 7 and 8 show a further modification of the preferred form of passageway means. Here the upward and downward passageways through the velocity-modifying means in vessel 10 are defined by conical shell members 60 welded together, as by the weld 61, at the points where their bases are in abutting relation to each other. Desirably, conical shells 60 are constructed as two frustoconical members connected together so that their apices are directed toward each other and their bases welded together, as particularly shown in FIGURE 8. With the construction shown, the preferential upward flow of the less dense phase is through the center of the conical shell member 60 through passageways 121, while the preferential downward flow of the denser phase is through the space between the shell members, designated as passageways 122. By this arrangement, it will be understood that the downward flow passageways 122 have a central portion which is substantially larger in area than the ends of the passageways, while the upward flow passageways 121 are substantially smaller in the central section than at either of their ends.

Figure 9:
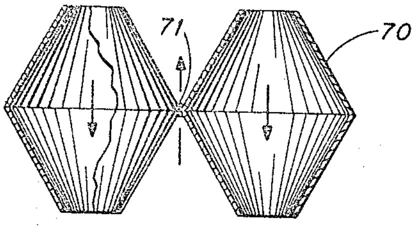
FIGURE 9 illustrates an alternative construction of the truncated conical shells similar to FIGURE 7, but in which the apices of pairs of cones are directed away from each other.

There is shown in FIGURE 9 a further alternative arrangement of the frustoconical shell members, which are identified generally as 70. These shells are positioned as the conical shell members illustrated in FIGURE 7. The primary distinction between the arrangements of FIGURE 7 and FIGURE 9 is that the downward flow path in FIGURE 9 is through the center of the frustoconical elements 70, while the upward flow is through the space between the shell members. With the arrangement of FIGURE 9, the velocity-modifying member for the reaction vessel is formed by a weld 71 securing the individual shells 70 together at their largest diameters.

Figures 10, 11, 12:
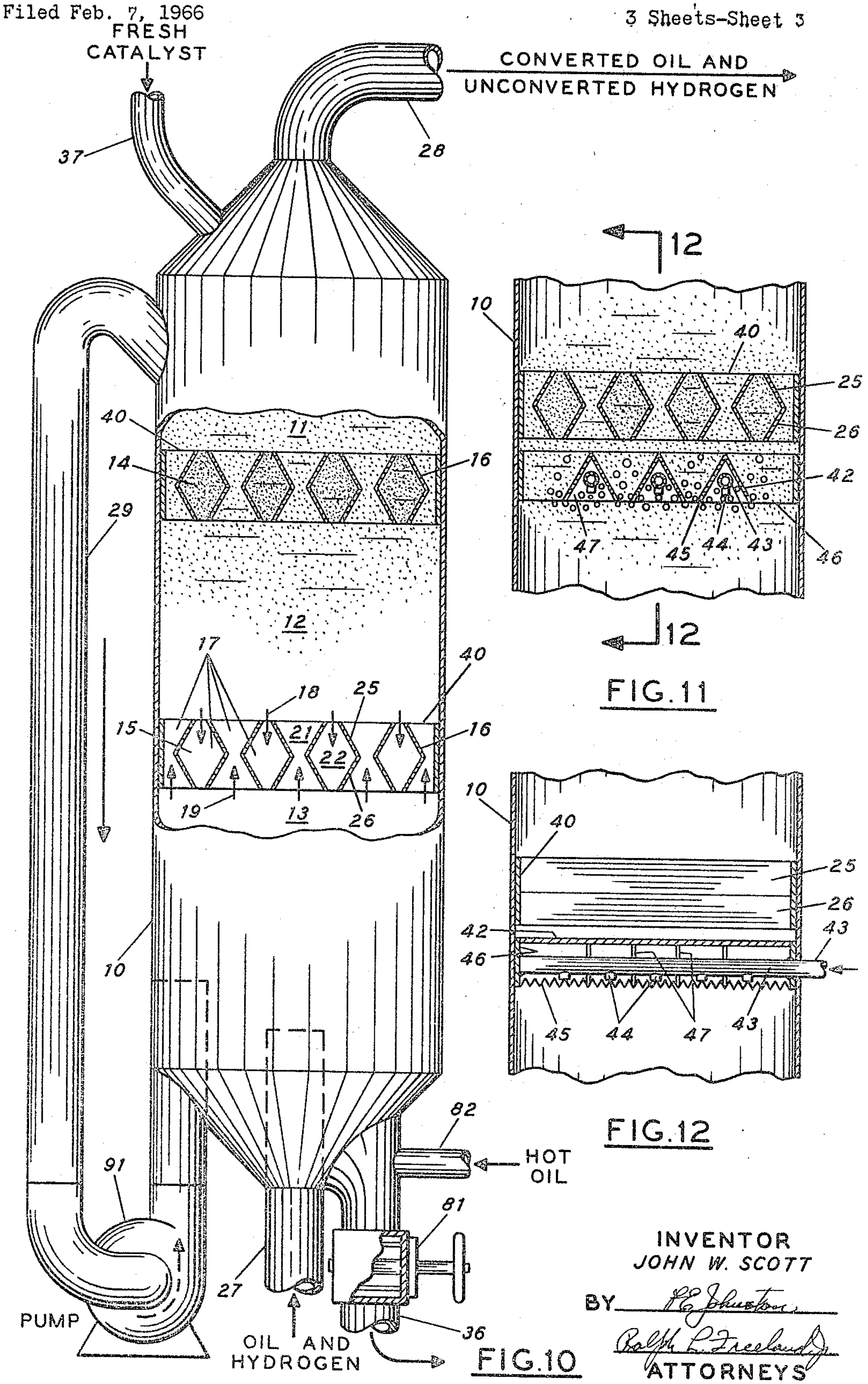
FIGURE 10 is a side elevation view, partially in cross-section, of the vessel of FIGURE 1 connected for hydroprocessing of hydrocarbons and hydrogen.
FIGURE 11 is a partial elevation view in cross-section of the reactor of FIGURE 9 modified to introduce a quench gas to control the hydroprocessing reaction.
FIGURE 12 is a cross-sectional view taken in the direction of arrows 12—12 in FIGURE 11.

FIGURE 10 illustrates a system using a preferred form of apparatus to perform the method of the present invention. As indicated, a stream of hydrocarbon, for example crude oil fractions and residua, that contains a substantial portion of hydrocarbons boiling above 1000° F., and hydrogen, are introduced as a combined stream through inlet pipe 27 at the bottom of reactor vessel 10. (Alternatively, the hydrogen may be separately introduced at the bottom by spraying or some other conventional means for obtaining initial distribution.) The reaction temperature is in the range from about 500° F. to 950° F., preferably from 750° F. to 875° F. The pressure in vessel 10 is from about 500 to 10,000 pounds per square inch, but preferably in the range of about 1000 to 4000 p.s.i. The relative quantity of hydrogen flowing concurrently in the stream is proportioned to the volume of hydrocarbon so that it contains about 2000 to 50,000 s.c.f./barrel of hydrocarbon; preferably hydrogen is present in an amount of 5000 to 20,000 s.c.f./barrel of hydrocarbon.

As indicated in the description of FIGURES 1 to 9, this flow will be upward through the mixing and reaction zones and catalytically contacts a hydrodynamically dispersed and supported flowing solid phase of hydrocracking catalyst particles having a size of about 20 to 200 mesh. The stream withdrawn at the bottom, as by pipe 36, will contain a proportionately greater concentration of catalyst than the average concentration of catalyst in vessel 10. Such withdrawal will normally be by batch process rather than continuously. A hot oil line 82 is provided to fluidize the catalyst settling leg 36 so that it can be withdrawn through a lock hopper, or valve 81. Fresh catalyst, or, return of catalyst withdrawn through leg 36, is introduced at the top of reactor 10 by supply line 37. While not indicated, flow through pipe 37 is desirably controlled by valves, lock hoppers, and the like. Preferential flow of the upwardly-flowing fluid stream of hydrocarbon and hydrogen and the downwardly flowing catalyst is indicated by the relative concentration of catalyst in fluid in velocity-modifying passageways 18 and 19 in the mixing zone 14. Operation of the contacting and mixing of catalyst with hydrogen and hydrocarbons is as described for FIGURES 1 to 9.

As further indicated in FIGURE 10, recirculation pipe 29 permits withdrawal from an upper portion of vessel 10 of a part of the fluid stream and catalyst being reacted for reintroduction at, or near the bottom of, the vessel. Pump 91 produces this circulation so that the space velocity of catalyst and fluids is independently variable with respect to feed rates. In this way, the apparatus can be operated with catalysts of different sizes and the feed stock may vary without requiring modification of the reactor vessel.

FIGURES 11 and 12 indicate a preferred arrangement for introducing quenched gas, such as hydrogen, to cool the catalytic reaction temperature in vessel 10. As shown, directly below one of the reaction zones, a plurality of horizontal tubes 43 including a plurality of nozzles 44 are positioned below bubble-forming deflector means 42 that form a tent-like housing over tubes 43. Preferably lower edges 45 of housings 42 are serrated to increase the bubble-forming capacity of the gas as it enters the liquid phase in vessel 10. The quench gas and bubble-forming arrangement is suitably supported in reactor 10 by ring 46. Desirably baffles 47 are positioned across housing 42 to assure even distribution of gas, even if support ring 46 becomes canted. This arrangement, not only prevents the exothermic reaction temperature of hydrocarbon fractions and hydrogen in the presence of the catalyst from exceeding a desired operating value, but also replenishes hydrogen consumed by reaction.

In accordance with the method of the present invention, any hydroprocessing catalyst may be employed which has a size and density such that it can gravitate through the fluid phase. A representative catalyst may be comprised of a base material selected from the group consisting of bauxite, alumina-silica hydrogels, and zeolites, and a hydrogenation-dehydrogenation promoting portion of the catalyst is selected from Groups V, VI, and VIII metals and compounds thereof. Cheap catalysts such as spray-dried alumina or alumina-silica based materials, or spent, metal-contaminated, cracking catalysts from conventional FCC units may also be employed. This gives the present invention a unique economic advantage, especially where hydro-demetalization is desired.

As indicated, the reaction product from vessel 10 is withdrawn as an overhead stream of converted oil and excess, or unconverted, hydrogen. In controlling the rate of flow and the reaction rate within vessel 10, it is sometimes desirable to operate at a temperature near the upper end of the preferred range from 750° to 875° so that the gas oils and lighter materials may be vaporized and distilled directly out of the reactor. For example, it has been found possible to convert a heavy California (Midway) residuum completely to 1000–1050° F. end point cat cracker feed by operating so that the reactor functions also as a hot stripper with the heavy gas oil products leaving in the vapor phase.

Among the types of crude oil stock, or feed, that can be reacted in a process of the type illustrated in FIGURES 10 to 12, are crude oil residua withdrawn as "bottoms" from a topping still or thermal cracker, oils recovered by solvent treating of residua, shale or tar-sand oils, coal oils, and the like. Such feeds normally contain substantial portions of hydrocarbons that boil above 1000° F. and frequently contain contaminants such as nitrogen, sulfur, oxygen, and organo-metallic compounds, formed by vanadium, iron and nickel, as well as drilling mud, rock dust, scale, and similar ash or extraneous solid material.

While various modifications and changes in the present invention will become apparent to those skilled in the art from the foregoing detailed description, all such modifications and changes which fall within the scope of the appended claims are intended to be included therein.

I claim:
1. Process for hydrocracking crude oil fractions and residua which comprises introducing into the lower end of a reaction vessel hydrogen and a hydrocarbon stream containing a substantial portion of hydrocarbons boiling above 1000° F. and containing hetero-organic contaminants such as nitrogen, sulfur, oxygen and organo metallic compounds at a temperature from 700° F. to 950° F. and pressure of 500 to 5000 pounds per square inch, said hydrogen being present and flowing concurrently with said stream at a rate of from about 2,000 to 50,000 s.c.f./barrel of hydrocarbon, introducing into the upper portion of said reaction vessel a catalytic solid having a particle size of 20 to 200 mesh, continuously flowing upwardly through said vessel said hydrocarbon stream and continuously flowing downwardly through said vessel said catalyst particles, the counterflow of said hydrocarbon stream and said particles being through a plurality of alternately arranged mixing zones and velocity-modifying zones, each of said velocity-modifying zones comprising a plurality of substantially unobstructed vertical passageways for said continuous flow, each of said passageways being equally accessible to said catalyst and said hydrocarbon stream, some of said passageways having a central portion larger in cross-sectional area than either end thereof and the remaining of said passageways having a central portion of smaller cross-sectional area than either end, said enlarged central portions preferentially permitting said catalyst to flow downwardly therethrough and said passageways with a smaller cross-sectional area permitting said hydrocarbon stream to pass preferentially therethrough and withdrawing a product stream from the top of said vessel.

2. A process in accordance with claim 1 in which a bleed stream of reaction catalyst and hydrocarbon is withdrawn from the bottom of said vessel, and fresh catalyst is supplied to the top of said vessel.

3. A process in accordance with claim 1 in which the hydrocarbon stream is reacted at a temperature of from 750 to 875° F. at a pressure of 1000 to 4000 p.s.i., and the hydrogen flowing concurrently therewith is at a rate of 5000 to 50,000 s.c.f./barrel of hydrocarbon.

4. A process in accordance with claim 1 which includes introducting between a vertically adjacent pair of said velocity-modifying zones a supply of hydrogen to replenish that dissolved in the oil, and to quench and control the temperature of the reaction in said vessel.

5. A process in accordance with claim 1 in which said catalytic solid is a porous high surface area stable material selected from the group comprising alumina-silica hydrogels, zirconia, boria, alumina, silica, magnesia, zeolites, and mixtures thereof.

6. A process in accordance with claim 5 in which said catalytic solid includes a hydrogenation-dehydrogenation promoting metal component selected from Group V, VI, VIII metals and compounds thereof.

7. A process in accordance with claim 1 in which the heat of reaction of the hydrogen and hydrocarbon stream in the presence of the catalyst is permitted to rise so that gas oils and lighter materials, having an end point up to about 1000° F., are directly distilled and are extracted with excess hydrogen from the top of said reaction vessel.

8. A hydrodynamically stable process for fluidized hydrocracking of crude oil fractions and residua without substantial back mixing of feed and product which comprises introducing into the lower end of a reaction vessel hydrogen and a hydrocarbon stream containing a substantial portion of hydrocarbons boiling above 1000° F. and containing hetero-organic contaminants such as nitrogen, sulfur, oxygen and organo-metallic compounds at a temperature from 700° F. to 950° F. and pressure of 500 to 5000 pounds per square inch, said hydrogen being present and flowing concurrently with said stream at a rate of from about 2,000 to 50,000 s.c.f./barrel of hydrocarbon, introducing into the upper portion of said reaction vessel for counterflow through said hydrocarbon stream a catalytic solid having a particle size of 20 to 200 mesh, both the upward flow of said hydrocarbon stream and the downward flow of catalyst particles being continuous within said vessel through a plurality of alternately arranged low pressure drop mixing and velocity-modifying zones, each of said velocity-modifying zones comprising a plurality of substantially unobstructed vertical passageways, each of said passageways being equally accessible to said catalyst and said hydrocarbon stream, some of said passageways having a central portion larger in cross-sectional area than either end thereof and the remaining of said passageways having a central portion of smaller cross-sectional area than either end, said passageways with enlarged central portions preferentially favoring flow of said catalyst downwardly therethrough and said passageways with smaller cross-sectional area preferentially favoring flow of said hydrocarbon stream upwardly therethrough, the openings in said passageways permitting local fluidized mixing of said catalyst and said hydrocarbon stream without substantial back mixing of converted and unconverted hydrocarbons and under hydrodynamically stable flow conditions of said particles and hydrocarbon stream at a low total pressure differential through said vessel, and withdrawing a stream of hydrocracked hydrocarbons from the top of said vessel.

References Cited by the Examiner

UNITED STATES PATENTS

| | | | |
|---|---|---|---|
| 2,925,378 | 2/1960 | Mitchell | 208—169 |
| 3,186,935 | 1/1962 | Vaell | 208—108 |

DELBERT E. GANTZ, *Primary Examiner.*

A. RIMENS, *Assistant Examiner.*